Patented June 6, 1944

2,350,768

UNITED STATES PATENT OFFICE 2,350,768

PROCESS OF PRODUCING VITAMIN CONCENTRATES

Henry B. Kellog, Union City, N. J., and Harris D. Hineline, Mount Vernon, N. Y.

No Drawing. Application July 2, 1940, Serial No. 343,550

7 Claims. (Cl. 167—81)

This application relates to a new and useful process for concentrating vitamin-containing oils; relates particularly to short-path, high-vacuum distillation processes, as applied to vitamin-containing oils, and relates especially to the combination of a controlled hydrogenation process applied to vitamin-containing oil substances, together with a short-path, high-vacuum distillation step for fractionating the vitamin substance from the oil solution, and the products resulting therefrom.

Many proposals have been offered for the deodorization and concentration of fish oils to yield pharmaceutical compounds having high vitamin potencies with a minimum of oily taste and fishy smell; but to the present none of these processes has been satisfactory, since they either fail to remove the obnoxious taste and obnoxious odor, or substitute another obnoxious taste for the original, or destroy a major portion of the vitamin substance.

Vitamin concentrates are substances of commercial importance, both as food materials, and as medicinal preparations in the maintenance of health and the cure of diseases resulting from vitamin deficiencies. The principal sources of vitamins A and D are the various fish oils, especially the fish liver oils. These raw materials contain, however, substantial quantities of substances which interfere seriously both with their use as foods and medicines and in the production therefrom of vitamin concentrates of still higher potency. Attempts have been made to concentrate the vitamins by such processes as removal of portions of the oil, and by such processes as distillation of the oil solution, to separate the vitamin substance from the solvent oil. To the present, however, none of these procedures has been satisfactory, the difficulties in no small part being due to the presence in the raw oil of unsaturated bodies such as clupanodonic acid, and its esters or both, which substances produce in the raw oil, a large portion of the unpleasant taste and odor, are difficult to remove, and in the short-path, high-vacuum distillation procedure for the production of vitamin concentrates tend to contaminate the distilled vitamin substances, either by direct distillation of the acid or ester or by the development of unsaturated or other breakdown products which distill at lower temperatures.

The present invention provides a purification process which is particularly applicable to fish and fish liver oils, although broadly applicable to vitamin-containing substances generally. Broadly, the process of the invention consists in a partial hydrogenation of the vitamin-containing substance, in combination with a short-path distillation procedure; the hydrogenation being applicable to the vitamin substances either before the short-path distillation, or after the short-path distillation step. According to the invention, the hydrogenation step is conducted at moderately elevated temperatures and moderately elevated pressures, to hydrogenate partially and selectively the unsaturated interfering substances in the vitamin-containing oil, or vitamin solution, the hydrogenation being carried to a critical point such that the odor and taste producing substances, and the unstable substances are saturated with hydrogen sufficiently to increase their stability and modify their distilling temperature to such an extent as to permit of the application of the short-path, high-vacuum distillation procedure in such a manner as to distill out the desired vitamins from a vitamin solution, with substantially no loss of vitamin potency to yield a distillate containing a high concentration of vitamin substances substantially free from obnoxious or unsaturated substances, and to yield a clear, tasteless and odorless vitamin substance.

Alternatively, the short-path, high-vacuum distillation step may be applied to the oil as a first step and the hydrogenation step may thereafter be applied to the distillate, to hydrogenate the objectionable substances and convert them into tasteless and odorless substances.

Fish and fish liver oils and vitamin-containing oils generally have been hydrogenated under conditions of high hydrogen pressure and elevated temperatures to yield oil solutions of vitamin substance which are substantially tasteless and odorless, because of the hydrogenation of the contained clupanodonic acid glycerides, which are the producers of the obnoxious taste, odor, and flavor. However, all of the hydrogenation processes previously proposed have the defect that the hydrogenation when continued sufficiently to overcome the taste and odor of the material, affects or destroys so much of the vitamin ester that the resulting vitamin potency is very greatly reduced; and this is true even though in some instances very substantial portions of the original oil are removed by chilling the mixture to crystallize the lower melting solids and filter pressing them for the separation of an oil solution of vitamin substance from the more highly hydrogenated substances followed by solvent extraction to remove any residual vitamins contained in the stearines. Similarly, various short-path distillation processes have been proposed for the separation of vitamin substances in pure or in more concentrated condition, but these processes also are unsatisfactory because the highly unsaturated fatty acid glycerides, principally clupanodonic fatty acid glycerides, in the original oil yield acrid, unpleasant tasting substances in the distillate.

The present invention teaches the combination of a controlled, limited, hydrogenation of the original oil, in combination with a short-path, high-vacuum distillation of the partially hydrogenated original oil, to separate the vitamin substance and a minimum amount of auxiliary oil substance, while avoiding the production of a distillate which would contain constituents giving rise to undesirable taste and odor producing substances.

Broadly, the procedure of the invention consists of a first step comprising a hydrogenation treatment under relatively slightly raised temperature and slightly elevated hydrogen pressure preferably in the presence of a nickel hydrogenation catalyst, which hyrogenation is continued only to such an extent as to reduce the iodine number of the original oil by approximately $\frac{1}{10}$; followed preferably by a degassing procedure and then by the step of a short-path, high-vacuum distillation process to separate the desired vitamin ester substance from the undesired oil bodies.

Thus an object of the invention is to combine the steps of hydrogenation and distillation in their application to a vitamin-containing oil, to obtain a vitamin concentrate which is free from substances, either original substances or breakdown substances which have taste or odor. Other objects and details of the invention will be apparent from the following description.

In practicing the invention a raw oil containing a minimum of free fatty acids is submitted to a hydrogenation process. If desired in order to produce a resulting clear sparkling product with a relatively light color and wholly odorless and tasteless, to satisfy certain demands of the trade, the fish or fish liver oil prior to, or after, controlled hydrogenation may be treated in a steam deodorizer at a temperature of 75° C. and a vacuum of 220-295 mm. of mercury for a short period of time. Preparatory to this controlled hydrogenation process, the iodine number of the raw or steam deodorized oil is determined and the oil is then placed in a pressure container and heated to a temperature preferably ranging between 45° C. and 75° C. To the oil there is added a suitable proportion of reduced nickel formate, and suitable proportions of siliceous filter aid may be added if desired. The hydrogenation chamber is preferably equipped with a turbine type of stirrer adapted to moderate speed of rotation. The container is then closed and air swept out by a current of hydrogen, after which a hydrogen pressure is built up within the hydrogenation chamber preferably within the range of 100 to 1000#/sq. in. In the present instance the hydrogen pressure is preferably limited to a value below approximately 1000#/sq. in. The hydrogenation is then continued, while maintaining the hydrogen pressure until the iodine number has been reduced by approximately $\frac{1}{10}$ of its original value, the hydrogenation being arrested when an iodine value approximately $\frac{1}{10}$ of its original value is reached.

It is found that pressures much above about 1000# per sq. in. are deleterious with respect to the vitamin ester, and such pressures markedly decrease the amount of vitamin substances present. Likewise temperatures in excess of 85° or 90° C. rapidly destroy the vitamin substance, hence it is highly desirable that the hydrogenation be conducted at temperatures and pressures below these limits. Excessive stirring is not necessary, since the hydrogen is sufficiently soluble in the oil to obtain the desired hydrogenation reaction within a reasonable time. The progress of the hydrogen is preferably watched by making iodine number determinations upon small samples withdrawn from the hydrogenation chamber. When the desired $\frac{1}{10}$ reduction in iodine number has been obtained, the hydrogen pressure is released, the oil cooled and filtered to remove the nickel catalyst (and the filter aid, if such has been added). The resulting oil while in this form is free from obnoxious taste and odor, or has the objectionable taste and odor substantially reduced, and is a particularly advantageous substance for short-path, high-vacuum distillation, since the undesirable clupanodonic fatty acid glycerides are hydrogenated and converted to the correspondingly lower unsaturated fatty acid glycerides. This selectively hydrogenated oil may then be degassified by well-known methods, such as by vacuum treatment including a rapid stirring, or by the discharge of a very slow current of inert gas, such as dry nitrogen or dry carbon dioxide, through the oil while it is held under a very good vacuum. Alternatively a very rapid stirring at low temperature may be applied to the oil during the vacuum treatment, in order to remove to the greatest possible extent, all of the gaseous substances including air, hydrogen and traces of moisture which may be present in the hydrogenated oil.

The degassified oil is then preferably subjected to a short-path, high-vacuum distillation as is shown in Patents Numbers 1,925,559, 1,942,858, 2,180,356 and 2,199,995 issued to Hickman.

During the distillation step, the vitamin ester distills out readily and cleanly, with a minimum of auxiliary substances, and substantially no unpleasant tasting or smelling substances. This particularly favorable distillation procedure occurs because of the enhanced stability of all of the oily substances present in the partially hydrogenated oil, and the absence of foul tasting or smelling material. The resulting distillate fraction or fractions are particularly valuable because of the relatively high proportion of vitamin ester, the very small wastage of vitamin ester substance, and the freedom from unpleasant tasting or smelling substances.

Among the many types of oils which may be employed as raw materials, either separately or in combination, are fish, fish liver and vegetable oils. Amonk the oils which may be utilized are fish oils such as eel, cod, herring, tuna, sardine, menhaden, and salmon oil; fish liver oils such as albacore, burbot, cod, dog fish, haddock, hake, pollock, tope fish, halibut, herring, ling, plaice, salmon, puffer, shark, skate, stereolepis, ishinagi, raja talvaga and seagull.

The short-path, high-vacuum distillation referred to or processes of high-vacuum molecular-short-path distillation are those which are carried out under such a low pressure that the residual gas molecules do not substantially interfere with the passage of the distilling molecules from the evaporating to the condensing surface, these respective surfaces being separated by a distance preferably not greater than the mean free path of the molecules of residual gas. Pressures below one tenth mm. may be used, but lower pressures such as below 0.01 mm. and preferably about 0.001 to 0.0001 mm. are most satisfactory for molecular distillation. The lowest pressures obtainable give best results, but as such low pressures are expensive and difficult to obtain and to maintain, they are not generally employed. The distance separating the evaporating and condensing surfaces can be increased with decrease in pressure since the mean free path of the gas molecules is practically inversely proportional to the pressure. Thus, with a pressure of 0.001 mm. it is well to have the surfaces within 1 inch or 2 inches of each other; with a pressure of 0.0001 mm. surfaces may be ten times this distance, and for other distances, similar distance ratios may be used.

Usually distances up to 10 inches, such as between ½ and 6 inches, have been found to be most satisfactory. Temperatures of between 120° C. and 350° C. may be employed for the distillation temperature. Those temperatures between 100° C. and 300° C., and especially between 120° and 260° C., are most satisfactory for distilling fish and fish liver oils to obtain vitamin concentrates. The latter ranges, and especially those temperatures between 100° C. and 240° C., have been found to be most satisfactory for distillation of vitamins from vitamin-containing oils.

In the following examples and descriptions we have set forth several of the preferred embodiments of our invention, but it is to be understood that they are included merely for purposes of illustration and not as a limitation thereof.

*Example 1.*—A sample of 30 pounds of cod liver oil having a vitamin A content of 9512 units per gram and an iodine number of approximately 154 was charged into a hydrogenating unit with 120 grams of reduced nickel formate suspended in cottonseed-oil, together with a catalyst carrier, such as kieselguhr, and a filter aid, such as cellite, the hydrogenating unit being previously charged with hydrogen to displace the air, and the oil raised to a temperature of 75° C. The reaction vessel was equipped with a stirrer of the propeller type adapted for speeds ranging from 200 to 450 R. P. M. When the oil was charged into the converter, the stirrer was put into operation and a hydrogen pressure of approximately 100 lbs. per sq. inch was applied until the iodine number was reduced to 138.6. After filtration to remove the catalyst a sample of the clear oil tested 9352 units of vitamin A per gram, indicating a loss of 160 units per gram. By careful control of the reduction in iodine number in the hydrogenation process, it is possible to selectively reduce the clupanodonic acid and its associated substances to less unsaturated fatty acid glycerides, such as linolenic and linoleic acid glycerides, which are not only odorless and tasteless, but remain fluids at room temperature.

In producing the pretreated odorless and tasteless fish oils of this invention, pressures ranging from 100 lbs. to 1000 lbs. per sq. inch may be used. The temperature, however, must be between 45° and 75° C. and the reduction of iodine number should be one unit for every 10 units of the original value of the oil being treated.

*Example 2.*—A similar quantity of cod liver oil was used as in Example 1 and operating under the same conditions until the iodine number was reduced to about 85. After filtration to remove the catalyst and catalyst carrier, the warm clear oil was allowed to reach room temperature and saturated fatty acid glycerides began to precipitate out and constituted approximately 60–70% of the total volume. A uniform mixture of the partially hydrogenated oil tested 8052 units of vitamin A per gram.

This example indicates that operating at 75° C. and 100 lbs. pressure until a reduction of iodine number from 154 to 85 was reached, there is a substantial loss of the vitamin A content with a preponderant formation of saturated fatty acid glycerides. Due to the large loss of the vitamin A content the oil of this process was unsuitable for short-path-high molecular distillation.

*Example 3.*—A 30 lb. charge of shark liver oil having 15,232 units of vitamin A per gram and an iodine number of 118.3 was put into the hydrogenating unit and hydrogenated at a temperature of 55° C. and 1000 lbs. pressure per sq. inch until approximately 30 cu. ft. of hydrogen had been absorbed to reduce the iodine number from 118.3 to 108. At the conclusion of the hydrogenation reaction the vitamin A content was 15,008 units showing only a slight loss of 224 units. The clear filtered oil when allowed to reach room temperature did not precipitate any stearine.

It will be observed that only a very slight loss in vitamin A content occurred. It will be noted that the oil at the conclusion of the hydrogenation was a fluid oil with substantially no change in physical appearance and no tendency to solidify or precipitate saturated fatty acid glycerides. This procedure is applicable to any fish or fish liver oil or combination thereof containing vitamins A, D or E, singly or in admixture, in which there are lower unsaturated fatty acid glycerides produced from the higher unsaturated fatty acid glycerides by careful control in the reduction in the iodine number and not exceeding pressures from 100 lbs. to 1000 lbs. per sq. inch.

In order to ascertain the effect of hydrogen pressures higher than 1000 lbs. per sq. inch upon the vitamin content of the oil to be treated and particularly the effect upon the selectivity of reducing the clupanodonic acid glycerides and its associated substances to less unsaturated fatty acid glycerides, the following experiment was resorted to.

*Example 4.*—A 30 lb. charge of shark liver oil having 15,232 units of vitamin A per gram and an iodine number of 118.3 was put into the hydrogenation unit at a temperature of 55° C., together with a catalyst as above described, and hydrogenated at 1500 lbs. per sq. inch until approximately 35 cubic feet of hydrogen were absorbed. The time required was 1 hour and the reduction in iodine number was 17.8 units, that is, reduced from 118.3 to 100.5. After filtration the oil showed a vitamin A content of 13,888 units per gram which amounts to a loss of approximately 1,344 units. When the clear warm oil was permitted to reach room temperature a heavy deposit of stearine was observed at the side of the sample bottle.

Pressures of 1500 lbs. per sq. inch or over thus are found to be detrimental to the process of producing odorless and tasteless oils. The destruction of vitamin A is too great and the formation of stearine is quite substantial and it is not permissible to process the products further by the short path-high molecular distillation in order to obtain a substantial amount of the vitamins present in the original oil.

*Example 5.*—A charge of 3000 grams of cod liver oil used in Example 1 was subjected to distillation in a small high vacuum still having the vaporizing and condensing surfaces separated about 1 inch. The following table indicates the course of the distillation and the potency of the resulting fractions.

| Fraction | Still pressure | Still temp. | Weight | Vitamin A potency |
|---|---|---|---|---|
| | Microns | °C. | Grams | |
| 1 | 3 | 130–175 | | 21,300 |
| 2 | 2.5 | 175–200 | 15 | 180,000 |
| 3 | 2.5 | 200–220 | 40 | 132,000 |
| 4 | 2.0 | 220–230 | 94 | 75,000 |
| 5 | 2.0 | 235 | 167 | 46,600 |

The condensates had a strong nauseating fishy odor. 150 parts by weight of fraction 5, since it was the largest, were treated at 65° C. in the presence of a reduced nickel formate catalyst supported on Kieselguhr under a hydrogen pressure of 500 lbs. After about 0.25 cubic foot of hydrogen was absorbed, the material was removed from the hydrogenating unit. The product obtained after removal of the catalyst was a clear odorless tasteless oil having a vitamin content of 45,800 units per gram without any appreciable formation of stearine.

In order to test out the conditions above described for treating distillates containing an exceedingly high vitamin A content so as to improve the products for odor and taste, and particularly to determine the effect of reducing the iodine number more than 1 unit for every 10 units, the following experiment was resorted to.

*Example 6.*—A sample of 200 grams of a condensate from a short-path still as a third fraction at a still pressure of 2.5 microns and a still temperature of 210–220° C. and having a vitamin A content of 170,600 units per gram and a strong fishy smell was charged into a hydrogenation reactor at a temperature of 60° C. and a pressure of 550 pounds per sq. inch and hydrogenated until the iodine number of the oil showed a decrease of 1 unit for every 10 units. At the close of the hydrogenation reaction, the vitamin A content was 168,700 and when the oil was permitted to stand at room temperature, no appreciable amount of stearine formation was found.

*Example 7.*—A similar amount of short-path high molecular concentrate as in Example 6 was put into the same reactor at a temperature of approximately 55° C. and a pressure of 1500 lbs. per sq. inch and hydrogenated until the iodine value was reduced by $\frac{1}{10}$. After the hydrogenation and filtration, the product showed a heavy deposit and stearine and had a vitamin A content of 154,700 units, showing a loss of approximately 15,900 units per gram.

This example definitely shows that pressures of 1,000 lbs. per sq. inch and higher have an adverse effect on the vitamin A content, and that reducing the iodine number more than 1 unit per every 10 units of the original iodine value results in a substantial reduction of unsaturated fatty acid glycerides into stearines.

It is to be noted that in the careful hydrogenation of vitamin-containing oil prior to or after short-path-high molecular distillation the products obtained are fluids at room temperature and do not contain any undesirable qualities of stearine. The fishy odor is completely removed with the subsequent production of an odorless and tasteless product which does not contain any highly unsaturated fatty acid glycerides which tend to oxidize when exposed to air or light, thus preventing the gradual destruction of the vitamin content. If the oil is pretreated according to our process prior to short-path distillation, the slight hydrogenation odor is completely removed due to the light weight of hydrogen which is easily pumped out under conditions of high vacuum. Alternatively, however, a combination of steam and vacuum treatment may be employed if the conditions of our process are used in treating odoriferous condensates obtained from the short-path still. Although the product is odorless, tasteless and free from the disagreeable and undesirable fishy smell, a slight hydrogenation odor which resembles a buttery odor may be present, particularly when an unrefined oil is processed.

The essential features of this invention are found in the combination of a selective, controlled hydrogenation of the vitamin-containing oil, with a short-path distillation procedure under high vacuum; in the hydrogenation of the oil by such an amount as to reduce the iodine number by only approximately one tenth of its original value, as a preliminary step to the short-path, high vacuum distillation; and in the hydrogenation before distillation at temperatures in the range of 45° C. to 80° C. with hydrogen pressures in the range from 100 lbs. per sq. inch to 1000 lbs. per sq. inch, the higher pressures being used with the lower temperatures and vice versa.

Thus by the process of this invention vitamin-containing oils are given a combination of process treatments including a partial, selective, controlled hydrogenation by which unstable materials are modified and stabilized in their characteristics, together with a short-path, high-vacuum distillation step by which the vitamin esters are separated from the modified oil.

While there are above described but a limited number of embodiments of the invention, it is possible to produce still other embodiments without departing from the inventive concept herein disclosed and it is therefore desired that only such limitations be imposed upon the appended claims as are stated therein or required by the prior art.

The invention claimed is:

1. The process of producing vitamin concentrates comprising in combination the steps of hydrogenating a fish oil at a temperature below 80° C., and a hydrogen pressure below 1000 lbs./sq. in. in the presence of a hydrogenation catalyst for a time sufficient to hydrogenate selectively and partially the taste and odor producing substances to materials which are substantially liquid at room temperature the said liquid being reduced by $\frac{1}{10}$ in value of the original iodine number and thereafter distilling the liquid material under short-path, high-vacuum conditions to produce a tasteless, odorless liquid vitamin concentrate.

2. An improvement in the process of producing a tasteless and odorless liquid vitamin bearing preparations which comprises subjecting a vitamin-containing fish liver oil to a hydrogenation treatment at a temperature ranging from 45° to 75° C. and pressures from 100 lbs. to 1000 lbs. per sq. inch for a period of time sufficient to reduce the iodine number of the vitamin-containing oil by 1/10 of its original value to convert selectively and partially the more highly unsaturated fatty acid glycerides to less saturated glycerides without a substantial formation of stearine and subjecting the resulting liquid product to a short-path, high-vacuum distillation.

3. The process of claim 2 wherein the distillation is carried out under short-path, high-vacuum conditions wherein the partially hydrogenated oil is heated in a thin film under a residual gas pressure within the range between 0.1 mm. (of Hg) and .00001 mm. and condensing the vaporized molecules upon a condensing surface located at a distance from the heated film between about ½ to 6 inches.

4. The process of producing liquid vitamin concentrates comprising the steps, in combination, of partially and selectively hydrogenating a vitamin-containing fish liver oil to transform taste and odor producing unsaturates, while avoiding the production of substances solid at room temperature, avoiding the complete hydrogenation of any lower unsaturates, and avoiding hydrolysis of esters by conducting the hydrogenation within the temperature range of 45° to 75° C. by the application of hydrogen within a pressure range between 100 pounds and 1000 pounds per sq. in., and a time sufficient to reduce the original iodine number of the vitamin containing oil by 1/10; and subjecting the partially hydrogenated filtered liquid oil to a short-path distillation procedure for separating the vitamin esters from a major portion of the partially reduced liquid oil.

5. The process of producing liquid vitamin concentrates comprising the steps, in combination, of partially and selectively hydrogenating a vitamin-containing cod liver oil to transform taste and odor producing unsaturates, while avoiding the production of substances solid at room temperature, avoiding the complete hydrogenation of any lower unsaturates by conducting the hydrogenation within the temperature range of 45° to 75° C. by the application of hydrogen within a pressure range between 100 pounds and 1000 pounds per square inch, and a time sufficient to reduce the original iodine number of the vitamin containing oil by 1/10; and subjecting the partially hydrogenated filtered liquid oil to a short-path high vacuum distillation procedure for separating the vitamin concentrate from a major portion of the partially reduced liquid oil.

6. The process of producing liquid vitamin concentrates comprising the steps, in combination, of partially and selectively hydrogenating a vitamin-containing shark liver oil to transform taste and odor producing unsaturates, while avoiding the production of substances solid at room temperature, avoiding the complete hydrogenation of any lower unsaturates by conducting the hydrogenation within the temperature range of 45° to 75° C. by the application of hydrogen within a pressure range between 100 pounds and 1000 pounds per square inch, and a time sufficient to reduce the original iodine number of the vitamin containing oil by 1/10; and subjecting the partially hydrogenated filtered liquid oil to a short-path high vacuum distillation procedure for separating the vitamin concentrate from a major portion of the partially reduced liquid oil.

7. The process of producing liquid vitamin concentrates comprising the steps, in combination, of partially and selectively hydrogenating a vitamin-containing fish liver oil to transform taste and odor producing unsaturates, while avoiding the production of substances solid at room temperature, avoiding the complete hydrogenation of any lower unsaturates by conducting the hydrogenation at 55° C. by the application of hydrogen within a pressure range between 100 pounds and 1000 pounds per square inch, and a time sufficient to reduce the original iodine number of the vitamin containing oil by 1/10; and subjecting the partially hydrogenated filtered liquid oil to a short-path high vacuum distillation procedure for separating the vitamin concentrate from a major portion of the partially reduced liquid oil.

HENRY B. KELLOG.
HARRIS D. HINELINE.